United States Patent
Ajioka et al.

(10) Patent No.: US 11,949,317 B2
(45) Date of Patent: Apr. 2, 2024

(54) VENTILATION STRUCTURE FOR AIR COOLING OF ELECTRIC MOTOR

(71) Applicant: Mitsubishi Electric Corporation, Tokyo (JP)

(72) Inventors: Yoshifumi Ajioka, Tokyo (JP); Tetsuya Sakurada, Tokyo (JP); Seiji Haga, Tokyo (JP); Kazuki Iwasa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 457 days.

(21) Appl. No.: 17/272,450

(22) PCT Filed: Sep. 7, 2018

(86) PCT No.: PCT/JP2018/033194
§ 371 (c)(1),
(2) Date: Mar. 1, 2021

(87) PCT Pub. No.: WO2020/049715
PCT Pub. Date: Mar. 12, 2020

(65) Prior Publication Data
US 2021/0320555 A1    Oct. 14, 2021

(51) Int. Cl.
*H02K 5/20* (2006.01)
*H02K 9/06* (2006.01)

(52) U.S. Cl.
CPC ............ *H02K 5/207* (2021.01); *H02K 9/06* (2013.01); *H02K 2205/09* (2013.01)

(58) Field of Classification Search
CPC ...... H02K 5/207; H02K 9/06; H02K 2205/09; H02K 1/32; H02K 9/04
See application file for complete search history.

(56) References Cited

U.S. PATENT DOCUMENTS

| | | | |
|---|---|---|---|
| 2006/0226717 A1 | 10/2006 | Nagayama et al. | |
| 2013/0119795 A1* | 5/2013 | Haga | H02K 9/227 |
| | | | 310/59 |
| 2016/0261172 A1* | 9/2016 | Hana | H02K 9/06 |

FOREIGN PATENT DOCUMENTS

| | | |
|---|---|---|
| JP | S5125703 U | 2/1976 |
| JP | 2002010575 A | 1/2002 |

(Continued)

OTHER PUBLICATIONS

JP2014103762A English translation (Year: 2023).*

(Continued)

*Primary Examiner* — Christopher M Koehler
*Assistant Examiner* — Viswanathan Subramanian
(74) *Attorney, Agent, or Firm* — BUCHANAN INGERSOLL & ROONEY PC (57) ABSTRACT

A frame included in an electric motor has an inflow hole that allows outside air to flow in an interior of the electric motor and an outflow hole that allows the outside air having flowed in to flow out of the electric motor. The electric motor includes a first partition member forming a first ventilation path between the first partition member and the frame, and a second partition member forming a second ventilation path between the second partition member and the frame. In addition, the stator has a third ventilation path penetrating through the stator from one end to another end of the stator in a direction of a rotational axis and configured to communicate with the first ventilation path and the second ventilation path.

12 Claims, 8 Drawing Sheets

(56) References Cited

FOREIGN PATENT DOCUMENTS

| | | | |
|---|---|---|---|
| JP | 2012016210 A | | 1/2012 |
| JP | 2014103762 A | * | 6/2014 |
| JP | 2016036234 A | * | 3/2016 |
| WO | 2010037975 A2 | | 4/2010 |

OTHER PUBLICATIONS

JP2016036234A English translation (Year: 2023).*
International Search Report (PCT/ISA/210) dated Nov. 20, 2018, by the Japan Patent Office as the International Searching Authority for International Application No. PCT/JP2018/033194.
Written Opinion (PCT/ISA/237) dated Nov. 20, 2018, by the Japan Patent Office as the International Searching Authority for International Application No. PCT/JP2018/033194.
Office Action dated Mar. 16, 2022, issued in corresponding Indian Patent Application No. 202127008602, 6 pages.
Office Action dated Jun. 8, 2021, issued in corresponding Japanese Patent Application No. 2020-540968, 9 pages including 5 pages of English translation.

* cited by examiner

VENTILATION STRUCTURE FOR AIR COOLING OF ELECTRIC MOTOR

TECHNICAL FIELD

The present disclosure relates to an electric motor.

BACKGROUND ART

An electric motor includes a shaft, a rotor that is attached to the shaft to integrally rotate together, and a stator that opposes the rotor in a radially spaced apart manner. Energizing the electric motor leads to a rise of temperatures of a stator core and a stator coil of the stator and a rotor core and a rotor conductor of the rotor. To address this, an interior of the electric motor is cooled with an air flow through an airhole formed in the stator core, a gap between the stator core and the rotor core, and the like. An example of this type of electric motor is disclosed in Patent Literature 1. In the electric motor disclosed in Patent Literature 1, an airhole is formed in the stator core to cool the electric motor. This electric motor includes a pair of rings fitting over the stator core along a rotation axis direction of the shaft and having airholes. An air flows through each of the airholes of the pair of rings and the stator core cools the interior of the electric motor.

CITATION LIST

Patent Literature

Patent Literature 1: Unexamined Japanese Patent Application Publication No. 2012-016210

SUMMARY OF INVENTION

Technical Problem

The rings of the electric motor disclosed in Patent Literature 1 have a double structure of a radial outer tube and a radial inner tube. In this ring, air flows in a gap between the radial outer tube and the radial inner tube. The ring imposes constraints on reduction in size of the electric motor by radial thicknesses of the radial outer tube and the radial inner tube of the ring.

In view of the above circumstances, an objective of the present disclosure is to reduce size of the electric motor while maintaining cooling effects for the electric motor.

Solution to Problem

To achieve the above objective, an electric motor according to the present disclosure includes a shaft, a rotor, a stator, a frame, a first partition member, and a second partition member. The shaft is supported rotatably around a rotational axis. The rotor is disposed radially outward of the shaft and rotates integrally with the shaft. The stator opposes the rotor in a radially spaced apart manner. The frame contains the rotor and the stator and has a tubular shape with both ends closed, and the frame has an inflow hole that allows an outside air to flow in and an outflow hole that allows the outside air having flowed in to flow out. The first partition member is located nearer to the inflow hole than the stator and forms, between the first partition member and an inner circumferential surface of the frame, a first ventilation path for a flow of the outside air having flowed in from the inflow hole. The second partition member is located nearer to the outflow hole than the stator and forms, between the second partition member and the inner circumferential surface of the frame, a second ventilation path for a flow of the outside air. The stator has a third ventilation path penetrating through the stator from one end to another end of the stator in a direction of the rotational axis and communicating with the first ventilation path and the second ventilation path. The first partition member includes a first tubular member having an outer circumferential surface opposing the inner circumferential surface of the frame in a spaced apart manner, and a first attachment member extending in a direction from the outer circumferential surface of the first tubular member to the inner circumferential surface of the frame and fixed to the first tubular member and the frame.

Advantageous Effects of Invention

The present disclosure can achieve reduction in size of the electric motor in a radial direction by forming a ventilation path by the first partition member, the second partition member, and the frame.

DESCRIPTION OF EMBODIMENTS

An electric motor according to embodiments of the present disclosure is described below in detail with reference to the drawings. The same reference numerals are used throughout the drawings to refer to the same or like parts.

Embodiment 1

Figure 1:
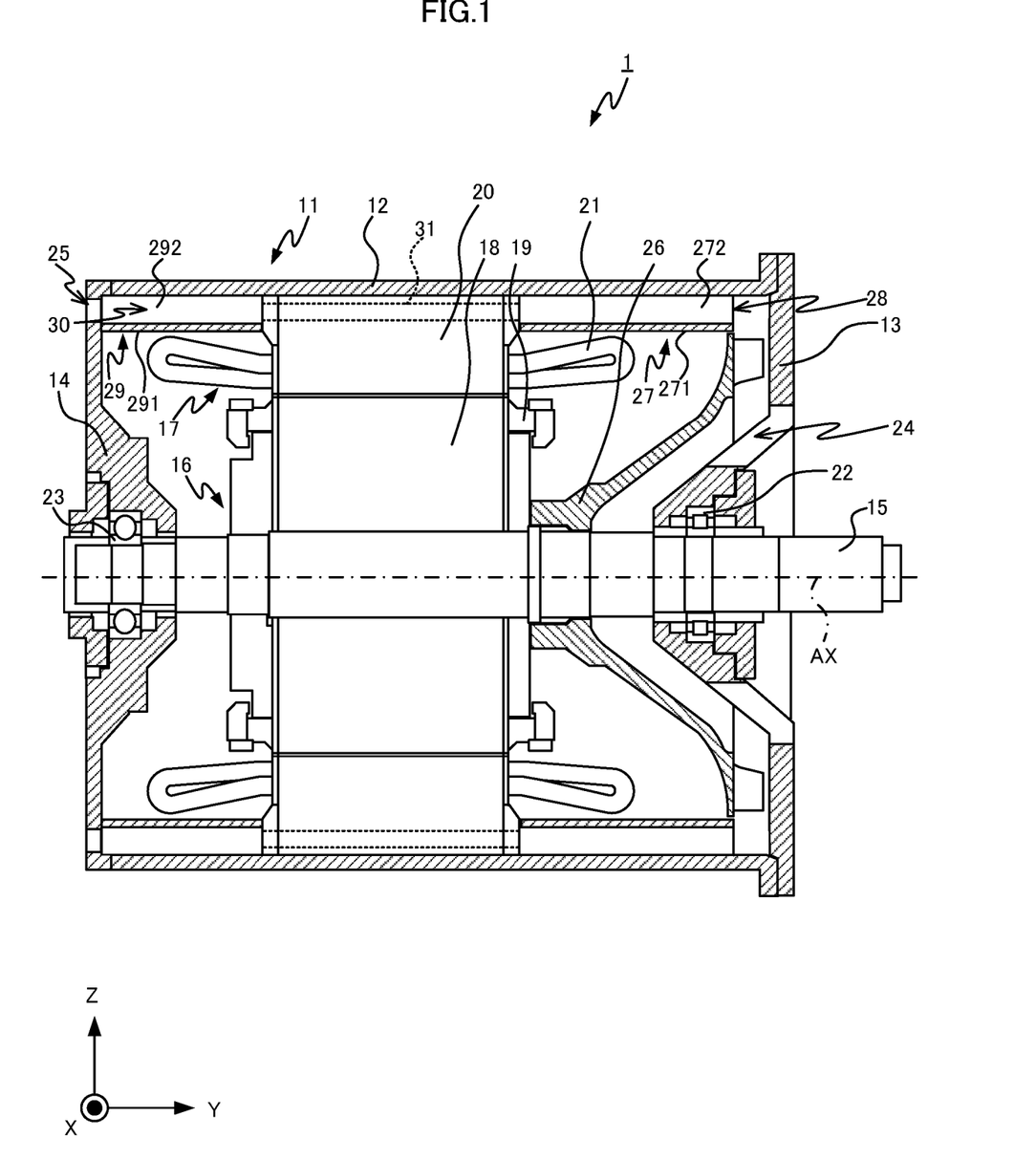
FIG. 1 is a cross-sectional view illustrating an electric motor according to Embodiment 1 of the present disclosure.

An electric motor according to Embodiment 1 is described using as an example an electric motor to be used for drive of a railway vehicle. As illustrated in FIG. 1, an electric motor 1 according to Embodiment 1 includes a frame 11, a shaft 15, a rotor 16 that rotates integrally with the shaft 15, and a stator 17 attached to the frame 11. In FIG. 1, a Z axis is in a vertical direction, a Y axis is in parallel to a rotational axis AX of the shaft 15, and an X axis is orthogonal to the Y axis and the Z axis. In FIG. 1, the rotational axis AX is indicated by a dot-and-dash line. Since the electric motor 1 is used as an electric motor for drive of a railway vehicle, the frame 11 is fixed to a bogie of the railway vehicle, and one end of the shaft 15 is coupled to an axle of the railway vehicle via a coupling and gears. The frame 11 includes a stator framework 12 having a tubular shape and brackets 13 and 14 that block both of Y-axis-direction ends of the stator framework 12. The stator framework 12 and the bracket 14 may be an integral tubular stator framework with one end closed, instead of being separate parts.

The rotor 16 is disposed radially outward of the shaft 15. The rotor 16 includes a rotor core 18 fitting over the shaft 15 and a rotor conductor 19 inserted into a groove on an outer circumferential surface of the rotor core 18. The stator 17 includes a stator core 20 attached to the stator framework 12 of the frame 11 and a stator conductor 21 inserted into a groove on the stator core 20. The outer circumferential surface of the rotor core 18 opposes the inner circumferential surface of the stator core 20 in a spaced apart manner. The electric motor 1 further includes bearings 22 and 23 that rotatably support the shaft 15. The bearing 22 is held by the bracket 13 and the bearing 23 is held by the bracket 14. One end of the shaft 15 that is closer to the bracket 13 is coupled to the axel of the railway vehicle via a coupling and gears that are unillustrated. Rotation of the shaft 15 provides power to the railway vehicle. The one end of the shaft 15 coupled to the axle is referred to as a drive side and the other side thereof is referred to as a non-drive side.

To cool the interior of the electric motor 1, the frame 11 has an inflow hole 24 that allows an outside air, which is an air in an exterior of the electric motor 1, to flow in the interior of the electric motor 1 and an outflow hole 25 that allows the outside air having flowed in to flow out to the exterior of the electric motor 1, and the electric motor 1 includes a fan 26 attached to the drive side of the shaft 15 and configured to rotate integrally with the shaft 15. To form a flow path of the outside air in the interior of the electric motor 1, the electric motor 1 further includes a first partition member 27 that forms a first ventilation path 28 between the first partition member 27 and the stator framework 12, and a second partition member 29 that forms a second ventilation path 30 between the second partition member 29 and the stator framework 12. Furthermore, a third ventilation path 31 is formed in the stator core 20. The third ventilation path 31 extends through the stator core 20 from one end to another end of the stator core 20 in the rotational axis AX, and communicates with the first ventilation path 28 and the second ventilation path 30. The stator core 20 has a plurality of third ventilation paths 31 spaced apart circumferentially.

A structure for cooling the interior of the electric motor 1 is described in detail. The frame 11 has the inflow hole 24 on an end side opposing the fan 26 in the direction of the rotational axis AX, that is, in the bracket 13. The frame 11 also has an outflow hole 25 in the bracket 14. Integral rotation of the fan 26 attached to the drive side of the shaft 15 together with the shaft 15 allows the outside air to flow from the inflow hole 24 in the interior of the electric motor 1. Since the rotation of the fan 26 can produce a radial outward flow of air, the outside air having flowed from the inflow hole 24 in the interior of the electric motor 1 flows in the first ventilation path 28 formed by the first partition member 27. An end portion near the inflow hole 24 of the first partition member 27 is located close to a radial end portion of the fan 26. For example, a spacing between the end portion near the inflow hole 24 of the first partition member 27 and the radial end portion of the fan 26 is less than 10 millimeters. This can suppress contact of foreign substances contained in the outside air having flowed in from the inflow hole 24 through between the fan 26 and the first partition member 27 with the stator conductor 21, the rotor conductor 19, and the like, and failure of the electric motor 1 due to the contact of the foreign substances with the stator conductor 21, the rotor conductor 19, and the like is can be prevented.

Figure 2:
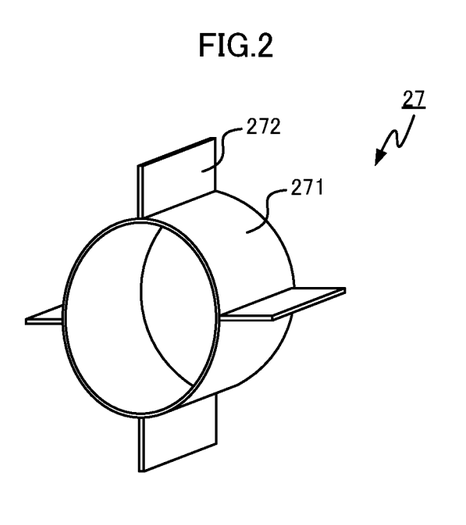
FIG. 2 is a perspective view of a first partition member according to Embodiment 1.

FIG. 2 illustrates a structure of the first partition member 27 forming the first ventilation path 28. The first partition member 27 includes a first tubular member 271 having a cylindrical shape and four first attachment members 272 having a plate-like shape. As illustrated in FIG. 1, the first tubular member 271 is disposed in contact with an end surface of the stator core 20 in the rotational axis AX. The outer circumferential surface of the first tubular member 271 is located more radially inward than the third ventilation paths 31 of the stator core 20. The first attachment member 272 extends in a direction from the outer circumferential surface of the first tubular member 271 to the inner circumferential surface of the stator framework 12. The first attachment member 272 is fixed to the first tubular member 271 and the stator framework 12. This fastens the first tubular member 271 to the stator framework 12 via the first attachment member 272. The four first attachment members 272 includes a pair of first attachment members 272 having main surfaces parallel to a YZ plane and disposed symmetrically relative to the rotational axis AX, and a pair of first attachment member 272 having main surfaces parallel to an XY plane and disposed symmetrically relative to the rotational axis AX.

Space between the outer circumferential surface of the first tubular member 271 fixed via the first attachment member 272 to the stator framework 12 and the inner circumferential surface of the stator framework 12 is the first ventilation path 28. The first ventilation path 28 communicates with the third ventilation paths 31 formed in the stator core 20. The structure of the second partition member 29 that communicates with the third ventilation paths 31 and forms the second ventilation path 30 leading to the outflow hole 25 is similar to the first partition member 27 illustrated in FIG. 2. The second partition member 29 includes a second tubular member 291 having a cylindrical shape and four second attachment members 292 having a plate-like shape. As illustrated in FIG. 1, the second tubular member 291 is disposed in contact with an end surface of the stator core 20 in the rotational axis AX. The second attachment member 292 extends in a direction from the outer circumferential surface of the second tubular member 291 to the inner circumferential surface of the stator framework 12. The second attachment member 292 is fixed to the second tubular member 291 and the stator framework 12. This fastens the second tubular member 291 to the stator framework 12 via the second attachment member 292. Similarly to the first attachment member 272 illustrated in FIG. 2, the four second attachment members 292 includes a pair of second attachment members 292 having main surfaces parallel to the YZ plane and disposed symmetrically relative to the rotational axis AX, and a pair of second attachment member 292 having main surfaces parallel to the XY plane and disposed symmetrically relative to the rotational axis AX. Space between the outer circumferential surface of the second tubular member 291 fixed to the stator framework 12 and the inner circumferential surface of the stator framework 12 is the second ventilation path 30.

Upon energization of the electric motor 1 having the aforementioned structure, temperatures of the stator core 20 and the stator conductor 21 increase. Upon energization of the electric motor 1 and integral rotation of the rotor core 18 and the shaft 15, the fan 26 rotates together with the shaft 15 and then air outside the electric motor 1 flows through the inflow hole 24 in the interior of the electric motor 1. The outside air having flowed through the inflow hole 24 in the interior of the electric motor 1 flows through the first ventilation path 28, the third ventilation path 31, and the second ventilation path 30 in this order, and flows out through the outflow hole 25 to the outside of the electric motor 1. The outside air having flowed in the interior of the electric motor 1 flowing through the third ventilation path 31 can cool the stator core 20 and the stator conductor 21, which suppress increase in temperatures of the stator core 20 and the stator conductor 21. Although the outside air having flowed in the interior of the electric motor 1 contains foreign substances such as dust or moisture, this outside air flows through the first ventilation path 28, the third ventilation path 31, and the second ventilation path 30 in this order and flows out through the outflow hole 25 to the outside of the electric motor 1, as described above. Thus, compared with a ventilated electric motor that allows outside air to flow a gap between the stator and the rotor, the electric motor 1 can suppress failure of the electric motor 1 caused due to attachment of the foreign substances to the stator conductor 21, the rotor conductor 19, and the like.

As described above, in the electric motor 1 according to Embodiment 1, the first ventilation path 28 is formed between the first partition member 27 and the stator framework 12 and the second ventilation path 30 is formed between the second partition member 29 and the stator framework 12. The first partition member 27 includes the first tubular member 271, and the first attachment member 272 extending from the outer circumferential surface of the first tubular member 271. The second partition member 29 includes the second tubular member 291, and the second attachment member 292 having a plate-like shape extending from the outer circumferential surface of the second tubular member 291. The first partition member 27 and the second partition member 29 can have a reduced radial thickness, compared with a ring member having a double structure of a radial outer tube and a radial inner tube. Thus reduction in size of the electric motor 1 in the radial direction can be achieved while maintaining cooling effects for the electric motor 1.

Embodiment 2

The structure of forming a flow path through which the outside air flows is not limited to the first partition member 27 and the second partition member 29. Any structure that can guide the outside air to the third ventilation path 31 without contacting the foreign substances contained in the outside air with the stator conductor 21, the rotor conductor 19, and the like and without increasing a size in the radial direction can be used as a structure of forming a flow path for a flow of the outside air. As an example, an electric motor 2 according to Embodiment 2 illustrated in FIG. 3 includes a second partition member 32 in place of the second partition member 29 included in the electric motor 1. Unlike the frame 11 in Embodiment 1, the frame 11 of this embodiment has the outflow hole 25 in the stator framework 12.

Figure 3:
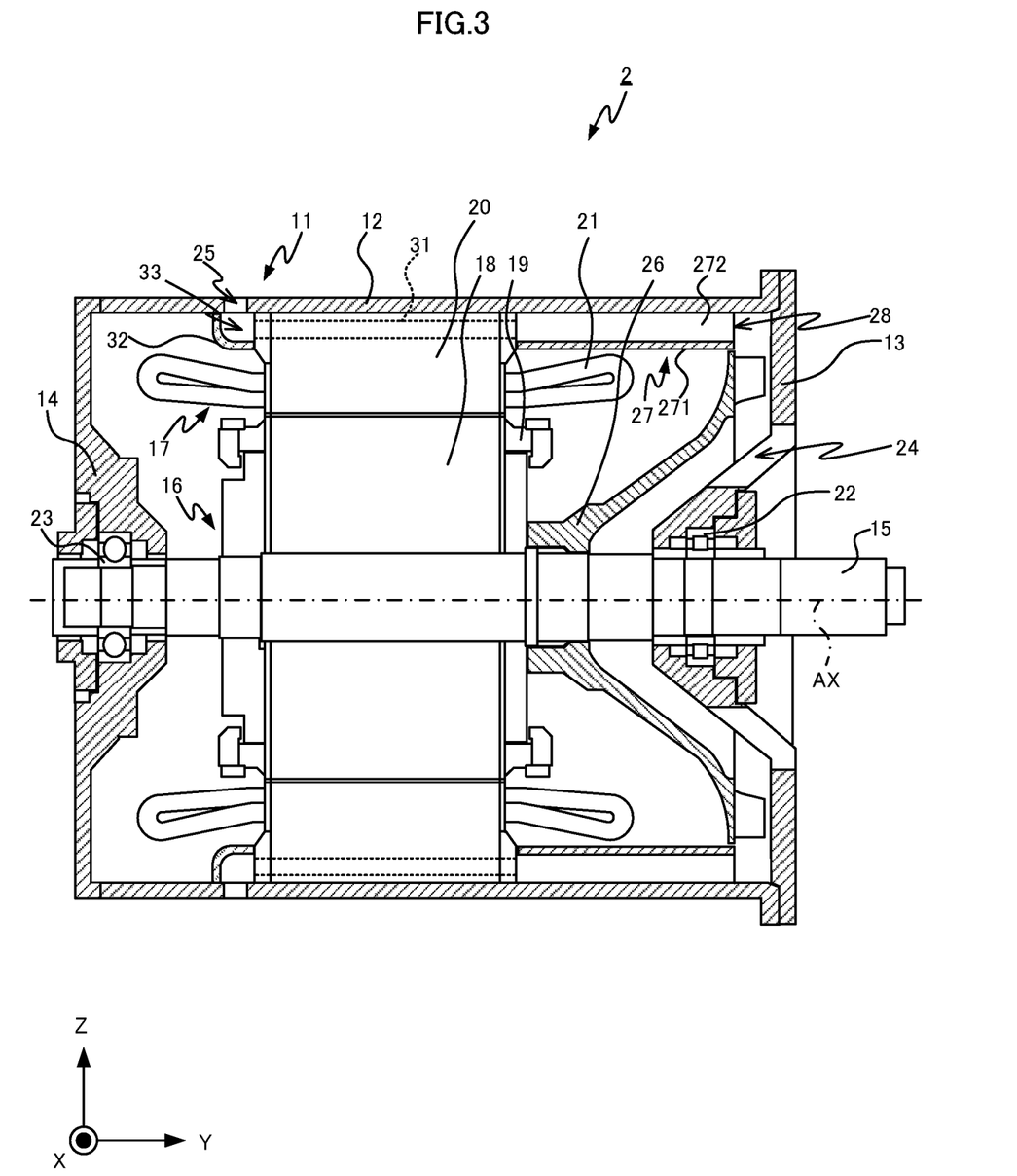
FIG. 3 is a cross-sectional view of an electric motor according to Embodiment 2 of the present disclosure.
Figure 4:
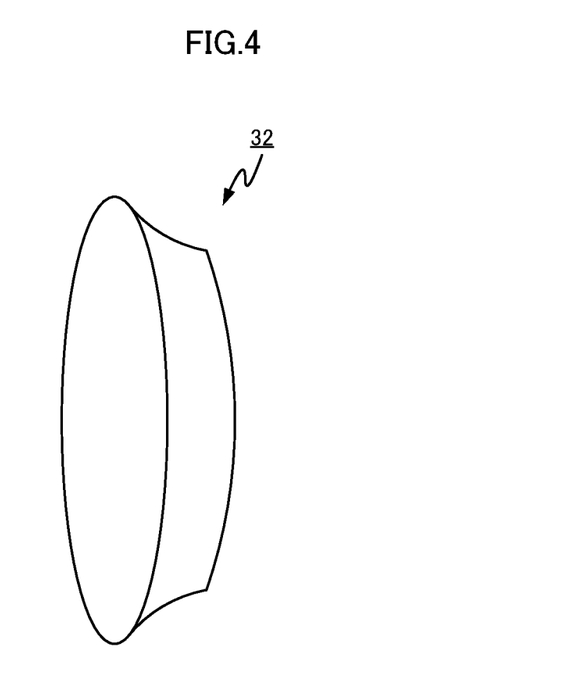
FIG. 4 is a perspective view of a second partition member according to Embodiment 2.

The second partition member 32 has a shape of a tube as illustrated in FIG. 4, and a diameter of the tube increases from one end to the other end of the tube. As illustrated in FIG. 3, one end of the tube is fixed to an end side of the stator core 20 in a direction of the rotational axis AX, and another end of the tube is fixed to the inner circumferential surface of the stator framework 12 at a position farther away from the stator core 20 than the outflow hole 25. With this structure, the second partition member 32 forms the second ventilation path 33 between the second partition member 32 and the inner circumferential surface of the stator framework 12. The second ventilation path 33 communicates with the third ventilation path 31 to form a flow path of the outside air to the outflow hole 25.

Upon energization of the electric motor 2 having the aforementioned structure, similarly to Embodiment 1, the fan 26 rotates together with the shaft 15 and then air outside the electric motor 2 flows through the inflow hole 24 in the interior of the electric motor 2. The outside air having flowed through the inflow hole 24 in the interior of the electric motor 2 flows through the first ventilation path 28, the third ventilation path 31, and the second ventilation path 33 in this order, and flows out through the outflow hole 25 to the outside of the electric motor 2. The outside air flowing through the third ventilation path 31 can cool the stator core 20 and the stator conductor 21, which suppress increase in temperatures of the stator core 20 and the stator conductor 21. Although the outside air contains foreign substances such as dust or moisture, this outside air flows through the first ventilation path 28, the third ventilation path 31, and the second ventilation path 33 in this order and flows out through the outflow hole 25, as described above. Thus, compared with a ventilated electric motor that allows outside air to be taken in, failure of the electric motor 1 caused due to attachment of the foreign substances to the stator conductor 21, the rotor conductor 19, and the like can be suppressed.

As described above, in the electric motor 2 according to Embodiment 2, the second ventilation path 33 is formed between the second partition member 32 and the stator framework 12. With this arrangement of the outflow hole 25 in the stator framework 12, a Y-axis-direction length of the second partition member 32 is shorter than the second partition member 29 included in the electric motor 1 according to Embodiment 1. That is, reduction in size of the electric motor 2 can be achieved with the Y-axis-direction length of the electric motor 2 being shorter than the Y-axis-direction length of the electric motor 1.

Embodiment 3

The structure of taking the outside air in the interior of the electric motor is not limited to the inflow hole 24, the outflow hole 25, and the fan 26. Any air blowing mechanism, an intake air mechanism, and the like can be adopted as long as the objective of the present disclosure can be achieved. As an example, an electric motor 3 according to Embodiment 3 illustrated in FIG. 5 includes, in place of the fan 26 included in the electric motor 1 according to Embodiment 1, an exterior fan 34 that is attached to the shaft 15 on the non-drive side and rotates integrally with the shaft 15. The electric motor 3 further includes a cover 35 that covers the exterior fan 34, and the cover 35 has an outside inflow hole 36 through which the outside air flows.

Figure 5:
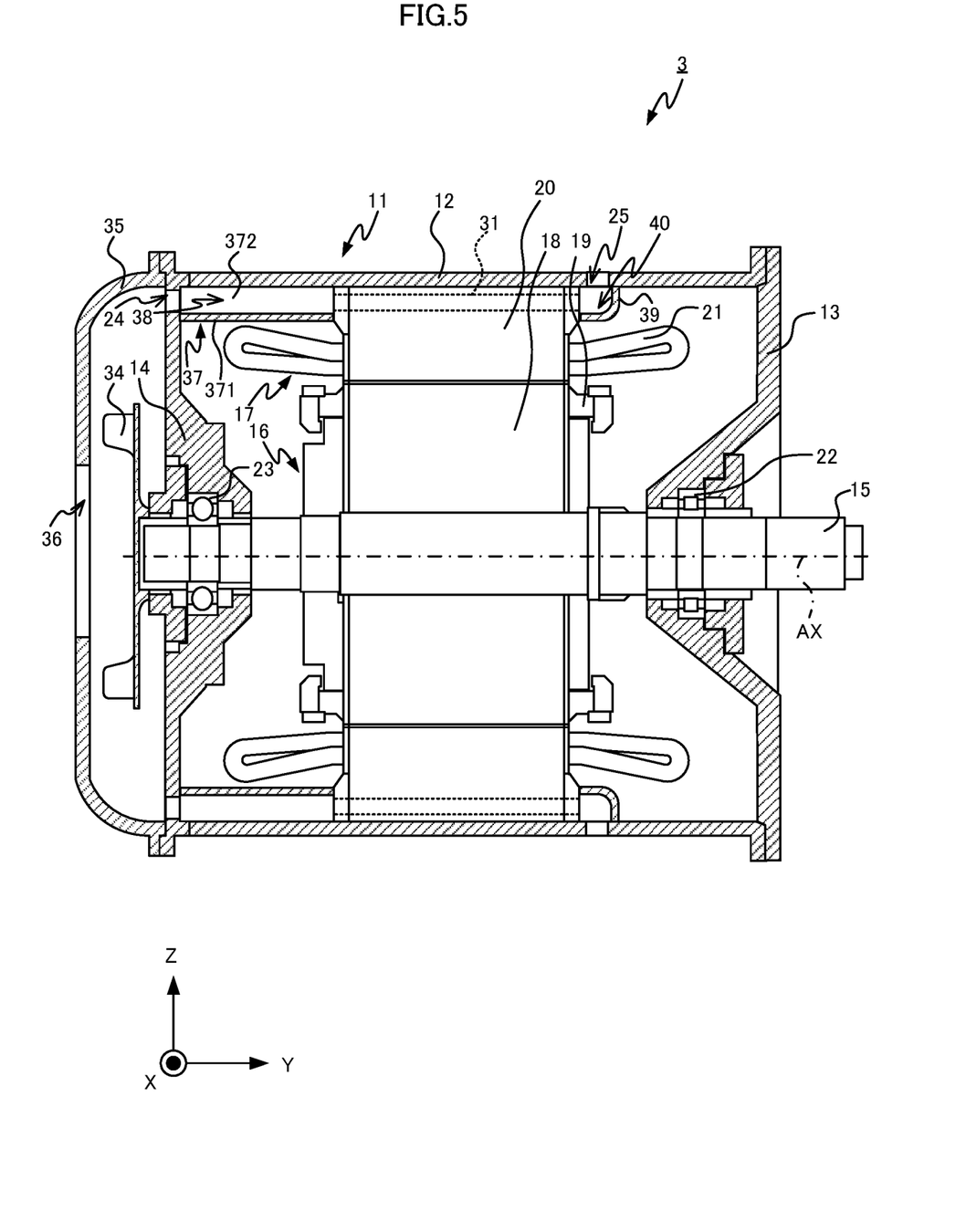
FIG. 5 is a cross-sectional view of an electric motor according to Embodiment 3 of the present disclosure.

Any structure that can guide the outside air to the third ventilation path 31 without contacting the foreign substances contained in the outside air with the stator conductor 21, the rotor conductor 19, and the like and without increasing a size in the radial direction can be used as a structure of forming a flow path for a flow of the outside air. As an example, the electric motor 3 includes a first partition member 37 and a second partition member 39, in place of the first partition member 27 and the second partition member 29 included in the electric motor 1 according to Embodiment 1. The frame 11 has the inflow hole 24 in the bracket 14 and the outflow hole 25 in the stator framework 12. That is, the outside air having flowed in the interior of the electric motor 3 flows from the non-drive side to the drive side, unlike Embodiments 1 and 2.

Similarly to the first partition member 27 illustrated in FIG. 2, the first partition member 37 includes a first tubular member 371 having a cylindrical shape and four first attachment members 372 having a plate-like shape. As illustrated in FIG. 5, the first tubular member 371 is disposed in contact with the end surface of the stator core 20 in the rotational axis AX and in contact with the end surface of the bracket 14 in the rotational axis AX. The first tubular member 371 is fixed to the end surface of the bracket 14 in the rotational axis AX at a position more radially inward than the inflow hole 24. The first attachment member 372 extends in a direction from the outer circumferential surface of the first tubular member 371 to the inner circumferential surface of the stator framework 12. The first attachment member 372 is fixed to the first tubular member 371 and the stator framework 12. This fastens the first tubular member 371 to the stator framework 12 via the first attachment member 372. The four first attachment members 372 includes a pair of first attachment members 372 having main surfaces parallel to the YZ plane and disposed symmetrically relative to the rotational axis AX, and a pair of first attachment member 372 having main surfaces parallel to the XY plane and disposed symmetrically relative to the rotational axis AX. Space between the outer circumferential surface of the first tubular member 371 fixed via the first attachment member 372 to the stator framework 12 and the inner circumferential surface of the stator framework 12 is the first ventilation path 38. The first ventilation path 38 communicates with the third ventilation path 31 formed in the stator core 20.

Similarly to the second partition member 32 illustrated in FIG. 4, the second partition member 39 has a shape of a tube, and a diameter of the tube increases from one end to the other end of the tube. As illustrated in FIG. 5, one end of the tube is fixed to an end side of the stator core 20 in a direction of the rotational axis AX, and another end of the tube is fixed to the inner circumferential surface of the stator framework 12 at a position farther away from the stator core 20 than the outflow hole 25. With this structure, the second partition member 39 forms the second ventilation path 40 between the second partition member 39 and the inner circumferential surface of the stator framework 12. The second ventilation path 40 communicates with the third ventilation path 31 to form a flow path of the outside air to the outflow hole 25.

Upon energization of the electric motor 3 having the aforementioned structure, the exterior fan 34 rotates together with the shaft 15, and air flows from the outside inflow hole 36 formed in the cover 35 in the interior of the cover 35. Air having flowed from the outside inflow hole 36 flows from the inflow hole 24 to the interior of the electric motor 3. The outside air having flowed through the inflow hole 24 in the interior of the electric motor 3 flows through the first ventilation path 38, the third ventilation path 31, and the second ventilation path 40 in this order, and flows out through the outflow hole 25 to the outside of the electric motor 3. The outside air flowing through the third ventilation path 31 can cool the stator core 20 and the stator conductor 21, which suppresses increase in temperatures of the stator core 20 and the stator conductor 21. Although the outside air contains foreign substances such as dust or moisture, this outside air flows through the first ventilation path 38, the third ventilation path 31, and the second ventilation path 40 in this order and flows out through the outflow hole 25, as described above. Thus, compared with a ventilated electric motor that allows outside air to be taken in, failure of the electric motor 3 caused due to attachment of the foreign substances to the stator conductor 21, the rotor conductor 19, and the like can be suppressed. Since the first partition member 37 is disposed in contact with the bracket 14 and the stator core 20, and the second partition member 39 is disposed in contact with the stator core 20 and the stator framework 12, leakage of the outside air to the interior of the electric motor 3 from the flow path formed by the first ventilation path 38, the third ventilation path 31, and the second ventilation path 40 can be suppressed compared with the electric motors 1 and 2. Thus, compared with the electric motors 1 and 2, failure of the electric motor 3 caused due to attachment of the foreign substances to the stator conductor 21, the rotor conductor 19, and the like can be suppressed.

As described above, in the electric motor 3 according to Embodiment 3, the first ventilation path 38 is formed between the first partition member 37 and the stator framework 12 and the second ventilation path 40 is formed between the second partition member 39 and the stator framework 12. The first partition member 37 includes the first tubular member 371, and the first attachment member 372 having a plate-like shape and extending from the outer circumferential surface of the first tubular member 371. The first partition member 37 can have a reduced radial thickness, compared with a ring member having a double structure of a radial outer tube and a radial inner tube. Thus reduction in size of the electric motor 3 in the radial direction can be achieved while maintaining cooling effects for the electric motor 3. With this arrangement of the outflow hole 25 in the stator framework 12, a Y-axis-direction length of the second partition member 39 is shorter than the second partition member 29 included in the electric motor 1 according to Embodiment 1. That is, reduction in size of the electric motor 3 can be achieved with the Y-axis-direction length of the electric motor 3 being shorter than the Y-axis-direction length of the electric motor 1. Since the electric motor 3 is not provided with a fan therein, the electric motor 3 do not need to have space for rotating a fan, which can achieve reduction in size compared with the electric motors 1 and 2.

Figure 6:
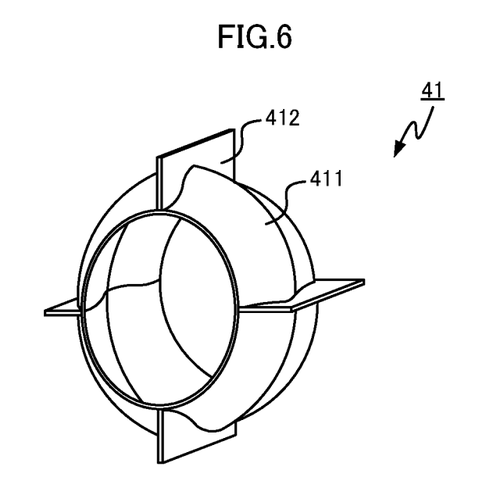
FIG. 6 is a perspective view of a first modified example of the first partition member according to an embodiment of the present disclosure.
Figure 7:
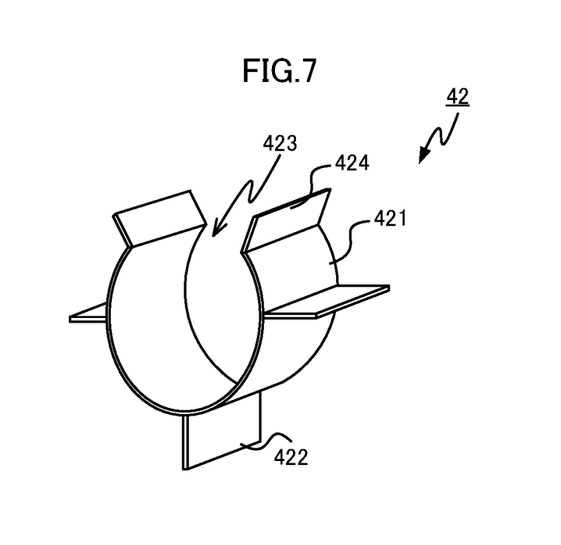
FIG. 7 is a perspective view of a second modified example of the first partition member according to an embodiment of the present disclosure.
Figure 8:
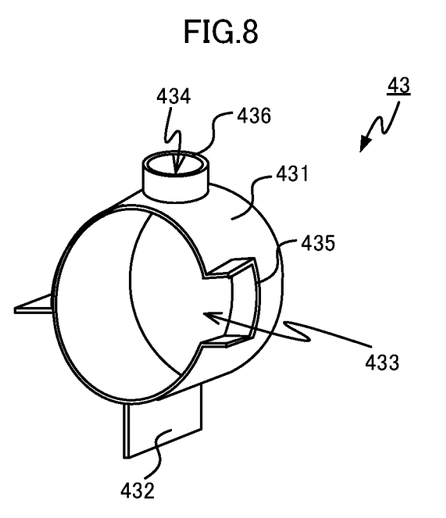
FIG. 8 is a perspective view of a third modified example of the first partition member according to an embodiment of the present disclosure.

The present disclosure is not limited to the aforementioned embodiments. The first partition member is not limited to the aforementioned example, and has any shape forming a ventilation path between the first partition member and the frame 11 and includes a tubular member and a plate-like member extending from the tubular member. Some of modified examples of the shape of the first partition member are illustrated in FIGS. 6 to 8. The first partition member 41 illustrated in FIG. 6 includes a first tubular member 411 and four first attachment members 412 having a plate-like shape. Unlike the first tubular members 271 and 371 having a constant diameter, a shape of the first tubular member 411 can be changed in accordance with an internal structure of the electric motors 1 to 3. Changing the shape of the first tubular member 411 in accordance with the internal structure of the electric motors 1 to 3 can reduce the size of the electric motors 1 to 3 in the radial direction more than when a flow path is formed with a member having a constant diameter adapted to a portion having the greatest radial size.

The first tubular member of the first partition member may have a slit, a cutout, a through hole, and/or the like. In this case, a flow path is formed around the slit, the cutout, the through hole, and/or the like, and a member for separating the flow path and the interior of the electric motor is disposed. An example of the first tubular member with the slit, the cutout, the through hole, or the like is illustrated in FIG. 7. The first partition member 42 illustrated in FIG. 7 has a first tubular member 421 and three first attachment members 422. The first tubular member 421 has a slit 423 extending in the direction of the rotational axis AX. Two barriers 424 are disposed around the slit 423. The first attachment member 422 and the barriers 424 extend from the outer circumferential surface of the first tubular member 421 toward the inner circumferential surface of the stator framework 12 and are fixed to the first tubular member 421 and the stator framework 12. The flow path and the interior of the electric motor are separated by the barriers 424.

Another example of the first tubular member with the slit, the cutout, the through hole, or the like is illustrated in FIG. 8. The first partition member 43 illustrated in FIG. 8 has a first tubular member 431 and two first attachment members 432. The first tubular member 431 has through holes 433 and 434. A barrier 435 is disposed around the though hole 433, and a tubular barrier 436 is disposed around the through hole 434. The barriers 435 and 436 extend from the outer circumferential surface of the first tubular member 431 to the inner circumferential surface of the stator framework 12, and are fixed to the first tubular member 431 and the stator framework 12. The flow path and the interior of the electric motor are separated by the barriers 435 and 436.

The structure of the second partition member 29 in FIG. 1 may be similar to that of the modified example of the first partition member illustrated in FIGS. 6 to 8. The lengths of the first attachment members 272, 372, 412, 422, and 432 in the direction of the rotation axis AX may be shorter than those of the first tubular members 271, 371, 411, 421, and 431 in the direction of the rotational axis AX. The length of the second attachment member 292 in the direction of the rotational axis AX may be shorter than that of the second tubular members 291 in the direction of the rotational axis AX.

Any combination of embodiments of the aforementioned embodiments can be used. For example, the electric motor 3 includes a pair of first partition members that sandwich the stator core 20 and has the outflow hole 25 in the bracket 13. The fan 26 may be attached to the non-drive side of the shaft 15 in accordance with where the electric motor is disposed. In this case, the inflow hole 24 is formed in the bracket 14 and the outflow hole 25 is formed in the bracket 13 or the stator framework 12.

In the aforementioned embodiments, an end portion of the first partition member 27 that is located near the inflow hole 24 being located close to a radial end portion of the fan 26 can suppress a flow of the outside air through between the fan 26 and the first partition member 27. To ensure suppression of the outside air passing through between the fan 26 and the first partition member 27, a flow path between the fan 26 and the first partition member 27 may have a shape of a labyrinth flow path.

Figure 9:
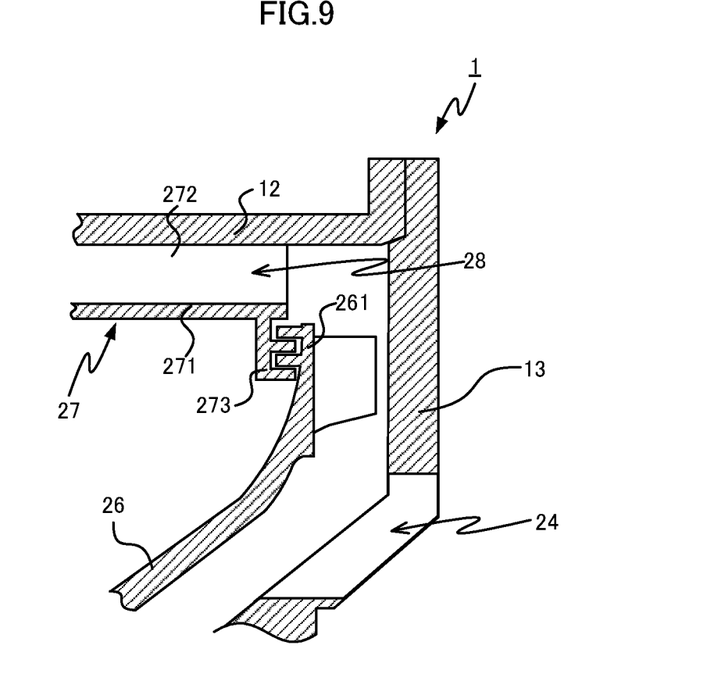
FIG. 9 is a diagram illustrating a fan and the first partition member according to an embodiment of the present disclosure.

An example of a case in which a flow path between the fan 26 and the first partition member 27 is a labyrinth flow path is illustrates in FIG. 9. A case in which the radial end portion of the fan 26 opposes an end portion near the inflow hole 24 of the first partition member 27 opposes in the direction of the rotational axis AX is described as an example. The fan 26 has a depression and projection portion 261 on a surface of the radial end portion that is located near the stator 17. The end portion that is a portion of the first tubular member 271 of the first partition member 27 and is located near the inflow hole 24 has a depression and projection portion 273. Opposing of the depression and projection portion 261 and the depression and projection portion 273 in the direction of the rotational axis Ax forms a labyrinth flow path between the fan 26 and the first partition member 27. For example, the depression and projection portion 261 and the depression and projection portion 273 are opposed to each other with a spacing therebetween of less than 10 millimeters in the direction of the rotational axis AX. With the above configuration, the flow path between the fan 26 and the first partition member 27 is a labyrinth flow path, which can suppress contact of foreign substances contained in the outside air through between the fan 26 and the first partition member 27 with the stator conductor 21, the rotor conductor 19, and the like. An abnormality of the electric motor caused due to contact of the foreign substances with the stator conductor 21, the rotor conductor 19, and the like is suppressed.

In the aforementioned embodiments, the first partition member 37 is disposed in contact with the bracket 14, but a labyrinth flow path may be formed between the first partition member 37 and the bracket 14.

The shape and orientation of the first attachment member 272 and a position of attachment to the first tubular member 271 are not limited to the aforementioned examples. The first attachment member 272 may have any shape that enables the first tubular member 271 to be fixed to the stator framework 12 without preventing a flow of the outside air in the first ventilation path 28 and without increasing a radial size. As an example, the shape of the first attachment member 272 may have a rod-like shape, or may be a shape extending in a direction crossing the rotational axis AX and fixed to the first tubular member 271 and the stator framework 12. The interior of the electric motors 1 to 3 may be cooled by take-in of cooling air blown by an exterior blower that operates independently of rotation of the shaft 15. The same applies to the first attachment members 372, 412, 422, and 432 and the second attachment member 292.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3 Electric motor
11 Frame
12 Stator framework
13, 14 Bracket
15 Shaft
16 Rotor
17 Stator
18 Rotor core
19 Rotor conductor
20 Stator core
21 Stator conductor
22, 23 Bearing
24 Inflow hole
25 Outflow hole
26 Fan
27, 37, 41, 42, 43 First partition member
28, 38 First ventilation path
29, 32, 39 Second partition member 30, 33, 40 Second ventilation path
31 Third ventilation path
34 Exterior fan
35 Cover
36 Outside inflow hole
261, 273 Depression and projection portion
271, 371, 411, 421, 431 First tubular member
272, 372, 412, 422, 432 First attachment member
291 Second tubular member
292 Second attachment member
423 Slit
424, 435, 436 Partition wall
433, 434 Through hole
AX Rotational axis

The invention claimed is:

1. An electric motor comprising:
   a shaft supported rotatably around a rotational axis;
   a rotor disposed radially outward of the shaft and configured to rotate integrally with the shaft;
   a stator opposing the rotor in a radially spaced apart manner;
   a frame containing the rotor and the stator and having a tubular shape with both ends closed, the frame having an inflow hole that allows an outside air to flow in and an outflow hole that allows the outside air having flowed in to flow out;
   a first partition member located nearer to the inflow hole than the stator and configured to form, between the first partition member and an inner circumferential surface of the frame, a first ventilation path for a flow of the outside air having flowed in from the inflow hole; and
   a second partition member located nearer to the outflow hole than the stator and configured to form, between the second partition member and the inner circumferential surface of the frame, a second ventilation path for a flow of the outside air, wherein
   the stator has a third ventilation path penetrating through the stator from one end to another end of the stator in a direction of the rotational axis and configured to communicate with the first ventilation path and the second ventilation path,
   the first partition member includes
      a first tubular member having an outer circumferential surface opposing the inner circumferential surface of the frame in a spaced apart manner, and
      a first attachment member extending in a direction from the outer circumferential surface of the first tubular member to the inner circumferential surface of the frame and fixed to the first tubular member and the frame, and
   the first ventilation path is formed between the outer circumferential surface of the first tubular member and the inner circumferential surface of the frame, wherein
   the second partition member has a shape of a tube, a diameter of the tube changes from one end to an opposite end.

2. The electric motor according to claim 1, further comprising:
   an exterior fan disposed outside the frame and configured to rotate integrally with the shaft; and
   a cover that covers the exterior fan, wherein
   the cover has an outside inflow hole that allows the outside air to flow into an interior of the cover,
   the frame has the inflow hole on an end side that is one of both end sides of the frame in the direction of the rotational axis and located near the exterior fan, and
   the first partition member forms, between the first partition member and the inner circumferential surface of the frame, the first ventilation path leading from the inflow hole to the third ventilation path.

3. The electric motor according to claim 2, wherein the first partition member includes the first tubular member having a cylindrical shape, and a plurality of the first attachment members extending in the direction from the outer circumferential surface of the first tubular member to the inner circumferential surface of the frame and the direction of the rotational axis.

4. The electric motor according to claim 3, wherein
   the frame has the outflow hole at a tubular portion of the frame, and
   one end of the tube of the second partition member is fixed to an end side of the stator in the direction of the rotational axis, and another end of the tube is fixed to the inner circumferential surface of the frame at a position farther away from the stator than the outflow hole to form the second ventilation path between the second partition member and the inner circumferential surface of the frame, diameter of the tube increases from the one end to the opposite end.

5. The electric motor according to claim 2, wherein
   the frame has the outflow hole at a tubular portion of the frame, and
   one end of the tube of the second partition member is fixed to an end side of the stator in the direction of the rotational axis, and another end of the tube is fixed to the inner circumferential surface of the frame at a position farther away from the stator than the outflow hole to form the second ventilation path between the second partition member and the inner circumferential surface of the frame, the diameter of the tube increases from the one end to the opposite end.

6. The electric motor according to claim 1, wherein the first partition member includes the first tubular member having a cylindrical shape, and a plurality of the first attachment members extending in the direction from the outer circumferential surface of the first tubular member to the inner circumferential surface of the frame and the direction of the rotational axis.

7. The electric motor according to claim 6, wherein
   the frame has the outflow hole at a tubular portion of the frame, and
   one end of the tube of the second partition member is fixed to an end side of the stator in the direction of the rotational axis, and another end of the tube is fixed to the inner circumferential surface of the frame at a position farther away from the stator than the outflow hole to form the second ventilation path between the second partition member and the inner circumferential surface of the frame, the diameter of the tube increases from the one end to the opposite end.

8. The electric motor according to claim 1, wherein
   the frame has the outflow hole at a tubular portion of the frame, and
   one end of the tube of the second partition member is fixed to an end side of the stator in the direction of the rotational axis, and another end of the tube is fixed to the inner circumferential surface of the frame at a position farther away from the stator than the outflow hole to form the second ventilation path between the second partition member and the inner circumferential surface of the frame, the diameter of the tube increases from the one end to the opposite end.

9. An electric motor comprising:
a shaft supported rotatably around a rotational axis;
a rotor disposed radially outward of the shaft and configured to rotate integrally with the shaft;
a stator opposing the rotor in a radially spaced apart manner;
a frame containing the rotor and the stator and having a tubular shape with both ends closed, the frame having an inflow hole that allows an outside air to flow in and an outflow hole that allows the outside air having flowed in to flow out;
a first partition member located nearer to the inflow hole than the stator and configured to form, between the first partition member and an inner circumferential surface of the frame, a first ventilation path for a flow of the outside air having flowed in from the inflow hole;
a second partition member located nearer to the outflow hole than the stator and configured to form, between the second partition member and the inner circumferential surface of the frame, a second ventilation path for a flow of the outside air, and
a fan disposed inside the frame and configured to rotate integrally with the shaft, wherein
the stator has a third ventilation path penetrating through the stator from one end to another end of the stator in a direction of the rotational axis and configured to communicate with the first ventilation path and the second ventilation path,
the first partition member includes
  a first tubular member having an outer circumferential surface opposing the inner circumferential surface of the frame in a spaced apart manner, and
  a first attachment member extending in a direction from the outer circumferential surface of the first tubular member to the inner circumferential surface of the frame and fixed to the first tubular member and the frame,
the frame has the inflow hole on an end side opposing the fan in the direction of the rotational axis, and
an end portion that is one of both end portions of the first partition member in the direction of the rotational axis and located near the inflow hole is in proximity to an end portion of the fan in a radial direction of the shaft, wherein
the second partition member has a shape of a tube, a diameter of the tube changes from one end to an opposite end.

10. The electric motor according to claim 9, wherein the first partition member includes the first tubular member having a cylindrical shape, and a plurality of the first attachment members extending in the direction from the outer circumferential surface of the first tubular member to the inner circumferential surface of the frame and the direction of the rotational axis.

11. The electric motor according to claim 10, wherein
the frame has the outflow hole at a tubular portion of the frame, and
one end of the tube of the second partition member is fixed to an end side of the stator in the direction of the rotational axis, and another end of the tube is fixed to the inner circumferential surface of the frame at a position farther away from the stator than the outflow hole to form the second ventilation path between the second partition member and the inner circumferential surface of the frame, diameter of the tube increases from the one end to the opposite end.

12. The electric motor according to claim 9, wherein
the frame has the outflow hole at a tubular portion of the frame, and
one end of the tube of the second partition member is fixed to an end side of the stator in the direction of the rotational axis, and another end of the tube is fixed to the inner circumferential surface of the frame at a position farther away from the stator than the outflow hole to form the second ventilation path between the second partition member and the inner circumferential surface of the frame, the diameter of the tube increases from the one end to the opposite end.

* * * * *